United States Patent [19]

Moeller

[11] 4,008,346
[45] Feb. 15, 1977

[54] PROCESS FOR PREPARING A POLYSILOXANE

[75] Inventor: Richard E. Moeller, Troy, N.Y.

[73] Assignee: General Electric Company, Waterford, N.Y.

[22] Filed: Dec. 18, 1974

[21] Appl. No.: 533,958

[52] U.S. Cl. .................. 427/387; 260/29.2 M; 260/46.5 R; 260/46.5 UA; 260/448.2 E; 260/448.2 Q; 428/447

[51] Int. Cl.² .......................................... B05D 3/02

[58] Field of Search ............ 260/46.5 UA, 448.2 Q, 260/448.2 E, 46.5 R, 29.2 M; 117/161 ZA; 427/387; 428/447

[56] References Cited
UNITED STATES PATENTS

| | | | |
|---|---|---|---|
| 3,280,214 | 10/1966 | Mitchell | 260/46.5 R |
| 3,294,725 | 12/1966 | Findlay et al. | 260/29.2 M |
| 3,322,722 | 5/1967 | Eynon | 260/46.5 R |
| 3,360,491 | 12/1967 | Axon | 260/46.5 R |
| 3,652,711 | 3/1972 | Triem et al. | 260/46.5 R |
| 3,657,164 | 4/1972 | Jastrow et al. | 260/46.5 UA |
| 3,697,469 | 10/1972 | Ikoma | 260/29.2 M |
| 3,706,695 | 12/1972 | Huebner et al. | 260/29.2 M |
| 3,843,601 | 10/1974 | Bruner | 260/46.5 R |
| 3,900,617 | 8/1975 | Grenoble | 427/387 |

*Primary Examiner*—Melvyn I. Marquis
*Attorney, Agent, or Firm*—E. Philip Koltos; Edward A. Hedman

[57] ABSTRACT

A novel process is disclosed for the preparation of a polysiloxane that is useful in the preparation of an emulsion for rendering flexible sheet material non-adherent to surfaces which normally adhere thereto.

9 Claims, No Drawings

PROCESS FOR PREPARING A POLYSILOXANE

This invention relates to a novel procedure for the preparation of a polysiloxane that is useful in the preparation of an emulsion for rendering flexible sheet material non-adherent to surfaces which would ordinarily adhere thereto.

BACKGROUND OF THE INVENTION

Polysiloxane based emulsions have been employed in the prior art for rendering flexible sheet materials non-adherent to surfaces that would ordinarily adhere thereto. These products have normally consisted of a silanol chain-stopped di-substituted polysiloxane which is cross-linked with a hydrogen containing polysiloxane. This reaction has been catalyzed by an organotin salt of a fatty acid.

In copending application Ser. No. 419,372, filed Nov. 27, 1973 and now U.S. Pat. No. 3,900,617 the limitations of the above-noted systems have been mentioned. That application is hereby incorporated by reference.

It has now been discovered that a greatly improved product for rendering flexible sheet material non-adherent to surfaces that would ordinarily adhere thereto will be obtained from a vinyl containing polysiloxane based emulsion, if the vinyl containing polysiloxane is prepared using a different procedure. The novel process provides an emulsion product that offers the following advantages:
  a. Lower manufacturing costs;
  b. Improved shear, dilution and freeze-thaw stability;
  c. Less penetration into porous substrates;
  d. More resistance to inhibition of cure on selected substrates;
  e. More resistance to rub-off from certain substrates.

The above-described advantages are secured by preparing a polysiloxane having a vinyl unsaturation by a process which is based on first homogenizing the tetramer reactants in water in the presence of a substituted benzene sulfonic acid, heating the tetramer reactants to polymerize the polysiloxane and adding an alkanolamine to terminate the polymerization reaction. A platinum catalyst may be dispersed with the tetramers prior to polymerization without risk of poisoning or deactivation. Alternatively, the platinum catalyst may be dispersed into the finished emulsion after addition of the alkanolamine, or at any subsequent time prior to the preparation of the coating bath.

DETAILED DESCRIPTION OF THE INVENTION

The invention is primarily directed to process for preparing an emulsion of a polysiloxane having the formula:

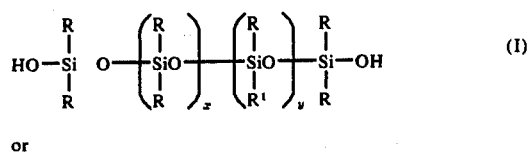

or

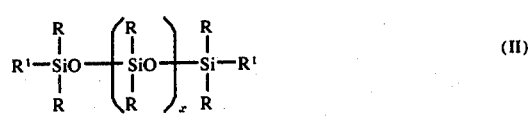

wherein R is a monovalent hydrocarbon radical free of unsaturation; $R^1$ is a hydrocarbon radical having vinyl unsaturation; $x$ and $y$ are positive integers so that the polysiloxane has from 0.1 to 1.0% by weight of $R^1$ groups and the viscosity of the polymer ranges between 25,000 centipoises and 1,000,000 centipoises. The process comprises:
  a. homogenizing a mixture of:
    i. a compound of the formula $(R_2SiO)_4$ wherein R is a monovalent hydrocarbon free of unsaturation;
    ii. a compound of the formula $(RR^1SiO)_4$ wherein R is the same as hereinabove defined and $R^1$ is a hydrocarbon radical having vinyl unsaturation;
    iii. a benzene sulfonic acid compound of the formula:

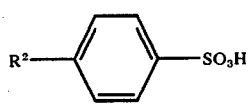

wherein $R^2$ is an alkyl group of from 6—18 carbon atoms; and
    iv. a platinum catalyst if desired;
  b. heating the homogenized mixture of (a) to polymerize the polysiloxane; and
  c. adding a neutralizing amount of an alkanolamine to said mixture to neutralize said benzene sulfonic acid compound.

The preferred polysiloxanes are of the formulae:

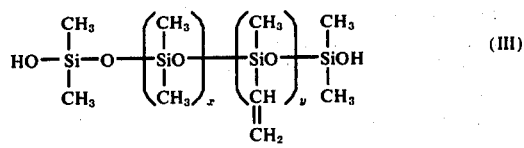

and

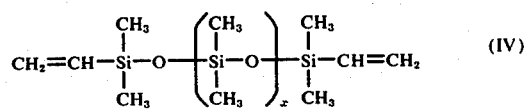

wherein $x$ and $y$ are the same as hereinabove defined.

The R groups of Formula 1 are monovalent hydrocarbon groups free of vinyl unsaturation and may be alkyl, e.g., methyl, ethyl, propyl, butyl, octyl, etc., aryl, e.g., phenyl, tolyl, xylyl, etc., cycloalkyl, e.g., cyclohexyl, cycloheptyl, etc., aralkyl, e.g., benzyl, phenethyl, etc., halogenated aryl, e.g., chlorophenyl, bromophenyl, chloronaphthyl, etc., cyanoalkyl, e.g., cyanoethyl, cyanopropyl, etc., or mixtures of any of the foregoing. $R^1$ is preferably vinyl but may also be $(CH_2)_n-CH=CH_2$ wherein $n$ is an integer of from 1 to 10.

A platinum catalyst, for cross-linking the above-described polysiloxane with an organohydrogenpolysiloxane may be added prior to initiation of the tetramer polymerization or after as discussed hereinabove.

The polymerization reaction is carried out by heating the reaction mixture at a temperature of from 40°–100° C., and more preferably, at a temperature of from 60°–80° C.

The heating cycle is followed by a cooling cycle during which significant increases in the molecular weight of the polysiloxane occur. The cooling cycle is induced by withdrawal of the heat source and thereafter the reaction is allowed to cool to ambient temperature. In the alternative, associated cooling means such as refrigeration coils may be employed. The heating cycle will usually comprise a period of from 1 to 24 hours, preferably, 2 to 4 hours and the cooling cycle will usually comprise from 1 to 8 hours, preferably, 2 to 5 hours. At the end of the cooling cycle, the alkanolamine is added to the reaction mixture to neutralize the benzene sulfonic acid. The alkanolamine is selected from compounds of the formula:

$(R^3OH)_3N$                                         (V)

wherein $R^3$ is lower alkylene of from 1 to 8 carbon atoms such as methylene, ethylene, propylene, butylene, octylene, etc. The preferred alkanolamine is triethanolamine. The amount of alkanolamine is based on the amount of benzene sulfonic acid and is sufficient to neutralize this acid. The alkanolamine is added with agitation to terminate the cooling cycle.

It is believed that during the heating step, the benzene sulfonic acid is actually acting as an equilibration catalyst. However, at lower temperatures, the polymerization process is kinetically favored compared to any "cracking" process. It has been observed that the longer the cooling cycle, the higher will be the molecular weight of the polysiloxane as measured by the viscosity.

If desired, conventional techniques may be used to break the polysiloxane emulsion. For example, a lower alkanol may be added to break the emulsion. The lower alkanol may be methanol, ethanol, propanol, etc.

The polysiloxanes of Formula (I) and (II) are useful in a process for rendering flexible sheet material non-adherent to surfaces which normally adhere thereto which process comprises:

a. treating the sheet material with aqueous emulsions containing:
 i. the polysiloxane containing vinyl unsaturation that is produced by the above-described process;
 ii. an organic hydrogen polysiloxane having the formula:

$(R)_a(H)_b SiO_{4-a-b/2}$                           (VI)

wherein R is a monovalent hydrocarbon radical free of unsaturation, $a$ is from 0 to 3, and the sum of $a$ plus $b$ is from about 0.8 to 3, there being at least two silicon-bonded hydrogen atoms per molecule; and
 iii. a platinum catalyst effective to cause copolymerization of (i) and (ii); and
b. thereafter drying the treated material.

The compounds of Formula (VI) may be linear, cyclic or resinous in nature, but preferably is linear or resinous. One illustrative material is a linear dimethyl hydrogen chain-stopped dimethylpolysiloxane material containing from 2 to 3 silicon atoms in the molecule. A further specific compound may be a resinous copolymer of dimethylsiloxane units, methylhydrogensiloxane units and trimethylsiloxane units which contain from 2 to 5 or 10 or more silicon atoms per molecule. Also illustrative are 1,3,5,7-tetramethylcyclotetrasiloxane; a copolymer containing the three dimethylhydrogen siloxane units and one monomethylsiloxane unit per molecule; and a low viscosity fluid composed of dimethylhydrogensiloxane units and $SiO_2$ units in the ratio of 2 moles of the former to 1 mole of the latter. Especially useful is a linear methylhydrogenpolysiloxane fluid or resinous methylhydrogenpolysiloxane. Such components are well known to those skilled in this art and are described in U.S. Pat. No. 3,436,366, which is hereby incorporated by reference. Also, U.S. Pat. No. 2,491,843 describes a useful family of linear trimethysilyl chain-stopped polysiloxanes. One is made by cohydrolyzing 5 parts of $(CH_3)_3—SiCl$ and 95 parts of $CH_3HSiCl_2$; viscosity 100 cps. at 25° C.

The platinum catalyst employed in the practice of this invention may be any of the well known platinum catalysts which are effective for catalyzing the reaction between silicon-bonded hydrogen groups and silicon-bonded vinyl groups. These materials include the various finely divided elemental platinum catalysts, such as those described in Bailey, U.S. Pat. No. 2,970,510, the chloroplatinic acid catalysts described in Speier, U.S. Pat. No. 2,823,218, the platinum-hydrocarbon complexes described in Ashby, U.S. Pat. Nos. 3,159,601 and 3,139,662 as well as the platinum alcoholate catalysts disclosed in Lamoreaux, U.S. Pat. No. 3,200,972. Regardless of the particular platinum catalyst employed, the catalyst is used in an amount sufficient to provide from about $10^{-3}$ to $10^{-6}$ gram atoms of platinum per mole of silicon-bonded vinyl groups in the composition. On another basis, a useful range of catalyst will provide one platinum atom for each 100 to 1,000,000 silicon-bonded vinyl groups in the silanol chain-stopped polysiloxane of Formula (I). Especially preferred is the range of 5–50 parts per million of platinum based on the weight of the silanol chain-stopped polysiloxane of Formula (I).

The preferred compositions for rendering flexible sheet materials non-adherent to surfaces which normally adhere thereto will comprise:

a. from 1 to 50% of the polysiloxane of Formula (I) or Formula (II);
b. from 0.01 to 5% of the organic hydrogen polysiloxane;
c. from 0.00001 to 0.0005% of platinum in the form of a salt or complex; and
d. from 60 to 98% of water.

The polysiloxane of Formula (I) is a novel polymer and it may be employed in the emulsion without being isolated in substantially pure form. It may also be isolated according to the techniques employed hereinafter in Test A. This polymer may be combined with an organohydrogensiloxane and cured into release or water-repellent coatings for application to paper, cloth and other substrates.

DESCRIPTION OF THE PREFERRED EMBODIMENTS

The following examples illustrate the process of the present invention. They are illustrative and the claims are not to be construed as limited thereto.

EXAMPLE 1

To a stainless steel beaker, the following materials were added;

| | |
|---|---|
| $[(CH_3)_2SiO]_4$ | 522.15 grams |
| $[(CH_3)CH_2CHSiO]_4$ | 2.85 grams |
| Platinum catalyst* | 0.40 grams |
| Distilled water | 525.00 grams |

| | |
|---|---|
| -continued | |
| Dodecylbenzene sulfonic acid | 7.50 grams |

*Of the type described in Lamoreaux, U.S. 3,220,972.

These materials were agitated for 30 minutes and then homogenized at 6500 psi through a Manton-Gaulin homogenizer. The emulsion was then heated to 70° C. and held at 70°–75° C. for 3.0 hours. The heat was removed and the emulsion was allowed to cool for 4.0 hours. At the end of the 4.0 hours, 3.8 grams of triethanolamine was added to neutralize the dodecylbenzenesulfonic acid and agitation was continued for 1.0 hour.

The resulting emulsion had a solids content of 43.7%. The emulsion viscosity was 350 cps. In order to determine the extent of the polymerization reaction, a portion of the siloxane fluid was recovered from the emulsion after using isopropyl alcohol to break the emulsion. The fluid was dried at 150° C. for 3–4 hours to remove residual alcohol and water. This fluid was found to have a viscosity of about 248,000 centipoises. Since the drying process undoubtedly removed some siloxane light ends, the values obtained for the viscosity of the siloxane fluid is probably higher than the "true" viscosity.

EXAMPLE 2

To a stainless steel beaker, the following materials were added:

| | | |
|---|---|---|
| $[(CH_3)_2SiO]_4$ | 855.2 | grams |
| $[(CH_3)CH_2CHSiO]_4$ | 4.5 | grams |
| Platinum catalyst* | 0.60 | grams |
| Distilled water | 1118.8 | grams |
| Dodecylbenzene sulfonic acid | 12.4 | grams |

*Same as Example 1.

The homogenization and heating cycle were carried out as in Example 1. At the end of the 3.0 hours heating cycle, the emulsion was split into two parts. Part A was cooled for 3.0 hours at ambient temperature before neutralization while Part B was cooled for 5.0 hours before neutralization. The physical properties of both products were evaluated and found to be as follows:

| | Part A | Part B |
|---|---|---|
| % solids | 38.8% | 39.9% |
| Emulsion viscosity | 76 cps. | 93 cps. |
| Fluid viscosity* | 168,000 cps. | 320,000 cps. |

*Determined in the same manner as in Example 1.

TEST A

To demonstrate the stability of the emulsion produced by the process of the invention, the following procedures were carried out using the material produced in Example 1.

a. Freeze-Thaw Stability—20 grams of the polysiloxane composition prepared in Example 1 was frozen at 15° C. daily for 4–6 hours and then allowed to thaw at room temperature. Testing was discontinued after 14 such cycles. There was no separation of free oil or any other apparent damage to the emulsion.

b. Emulsion and Dilution Stability—The emulsion of Example 1 was subjected to a standard test designed to determine the stability and dilution stability of different silicone emulsions. A sample of the emulsion was placed in a specially designed centrifuge tube and centrifuged for 80 minutes at 500 RPM's. After centifuging, samples were removed from the top and bottom layers of the emulsion and the percent solids were determined. The gradient for any particular emulsion is defined as:

Straight Gradient = (% solids of top layer) − (% solids of bottom layer) = $T_4 - B_1$ The lower the value of the gradient, the more stable is the particular emulsion. Note: This is an accelerated test which is useful in determining the "shelf life" of an emulsion.

In a similar manner, a dilute gradient is determined. In this case, 1.0 part of emulsion is diluted with 9.0 parts of water and agitated briefly to ensure uniformity. This diluted sample is then centrifuged as above and samples taken for percent solids determination. In the dilute gradient test, the gradient is defined as:

Dilute Gradient = $\frac{\% \text{ solids of top layer}}{\% \text{ solids of bottom layer}} = \frac{T_4}{B_1}$ Silicone emulsions prepared by conventional emulsification normally give straight gradient values ($T_4-B_1$) of from 2.0 to 5.0 and dilute gradient values ($T_4/B_1$) of 1.5 to 3.0.

When the emulsion of Example 1 was subjected to the test as described above, the straight gradient value was −0.18 and the dilute gradient value was 1.01. These results indicate that the emulsions of this invention are much more stable than silicone emulsions prepared by conventional emulsification techniques.

In a separate test, 15 grams of the composition produced in Example 1 was diluted with 135 grams of water and agitated in a Waring blender for 1.0 hours at approximately 10,000 RPMs. After agitation, there was no separation of free oil.

EXAMPLE 3

The sample of material that was subjected to the Freeze-Thaw procedure of Test A was formulated into the following coating bath:

| | |
|---|---|
| Polysiloxane emulsion of Example 1 | 10.30 grams |
| Methylhydrogen-containing siloxane and vinyl chain-stopped siloxane (40% emulsion)* | 0.60 grams |
| Dispersant** | 0.25 grams |
| Water | 38.85 grams |

*Emulsion 3, Serial No. 419,372
**Natrolsol 250 HR, a non-ionic water soluble hydroxyethyl cellulose.

This bath was coated onto a Plainwell semibleached kraft paper using a No. 5 Meyer rod and cured for 30 seconds at 300° F. Complete cure was achieved in this time, there being no smear, no migration and no rub-off. A sample of this coated paper was laminated to Johnson and Johnson adhesive tape and aged for 20 hours at 70° C. After aging, the release value was checked. Release was 35 gms./in. at 12 in./min.

EXAMPLE 4

A polysiloxane composition was prepared according to the method of Example 2 and formulated into the following coating bath:

| | |
|---|---|
| Polysiloxane emulsion of Example 2 | 9.7 grams |
| Methylhydrogen-containing siloxane and vinyl chain-stopped siloxane (40% emulsion) | 0.6 grams |
| Dispersant* | 1.0 grams |
| Water | 38.7 grams |

*PVA-Elvanol 72-60, a polyvinyl alcohol (98% hydrolyzed).

This bath was coated onto a Plainwell semibleached kraft paper as in Example 3. A 3 mil thickness of a water based SBR adhesive was applied to the coated paper and then dried 3 minutes at 300° F. After drying, the coated paper was laminated to vinyl film. Samples were checked for initial and aged release.

| Initial | Average values (gms./in. at 12 in./min.) 5 Day at 140° F. | 2 Weeks at 140° F. |
|---|---|---|
| 100 | 40 | 38 |

EXAMPLE 5

A polysiloxane was prepared by a procedure similar to that employed in Example 2 (Part B) and a bath was formulated as follows:

| | |
|---|---|
| Polysiloxane emulsion | 11.80 grams |
| Methylhydrogen-containing siloxane and vinyl chain-stopped siloxane (40% emulsion) | 0.60 grams |
| Dispersant* | 0.25 grams |
| Water | 37.75 grams |

*Natrosol 250 HR

This formulation was tested according to the procedure set forth in Example 4, except that cure conditions were varied as outlined below. Both initial and aged release values were determined.

| Cure Time at 300° F. | Release values (gms./in. at 12 in./min.) Initial | 1 Week at 70° C. | 2 Weeks at 70° C. |
|---|---|---|---|
| 20 sec. | 40 | 23 | 20 |
| 30 sec. | 33 | 28 | 23 |
| 30 sec.* | 30 | 20 | 18 |

*Sample not coated until the coating bath had been aged for 5 hours at 25° C.

EXAMPLE 6

At various times the cure characteristics of samples prepared in a manner similar to those of Examples 1 and 2 were compared to samples of emulsion prepared according to procedures set forth in copending application Ser. No. 419,372, filed Nov. 27, 1973, now U.S. Pat. No. 3,900,617 e.g., Example 1 of that application.

It was found in a series of tests that emulsion baths prepared as disclosed in this application would exhibit complete, migration-free cure after 30 seconds at 300° F., while samples of material prepared in the conventional manner still showed incomplete cure (migration) even after 45–60 seconds at 300° F. This difference was specific to certain substrates such as Hudson clay coated draft paper (with a latex-protein binder) and Brown Co.'s natural colored parchment.

EXAMPLE 7

To a stainless steel beaker, the following materials were added:

| | |
|---|---|
| $[(CH_3)_2SiO]_4$ | 350.0 grams |
| $CH_2{=}CH-\underset{\underset{CH_3}{\mid}}{\overset{\overset{CH_3}{\mid}}{Si}}-O-\underset{\underset{CH_3}{\mid}}{\overset{\overset{CH_3}{\mid}}{Si}}-CH{=}CH_2$ | 0.45 grams |
| Distilled water | 643 grams |
| Dodecylbenzene sulfonic acid | 5.0 grams |

The homogenization procedure and heating cycle were carried out in the same manner as previous Examples. The cooling cycle was carried out for 8.0 hours before the addition of 2.5 grams triethanolamine. The resulting emulsion had a percent solids of 31.9% and an emulsion viscosity of 18.5 cps. The fluid made by this process had a viscosity of 43,000 cps.

EXAMPLE 8

To stainless steel beaker, the following materials were added:

| | |
|---|---|
| $[(CH_3)_2SiO]_4$ | 522 grams |
| $[(CH_3)CH_2CHSiO]_4$ | 2.85 grams |
| $CH_3-\underset{\underset{CH_3}{\mid}}{\overset{\overset{CH_3}{\mid}}{Si}}-O{-}{\left(\underset{\underset{CH_3}{\mid}}{\overset{\overset{CH_3}{\mid}}{Si}}-O\right)}_2{-}\underset{\underset{CH_3}{\mid}}{\overset{\overset{CH_3}{\mid}}{Si}}-CH_3$ | As required (less than 0.05% by weight) |
| Distilled water | 525 grams |
| Dodecylbenzene sulfonic acid | 7.50 grams |

Following the same processing procedures as given in previous Examples, would yield an emulsion of physical properties comparable to those given in previous Examples.

In this particular case, the viscosity of the siloxane may be controlled not only by the length of the cooling cycle, but also by the amount of trimethylsilyl chain-stopper. The smaller the amount of this source of trimethylsilyl chain-stopper, the higher the polymer viscosity.

Obviously, many variations will suggest themselves to those skilled in the art from the above detailed description without departing from the scope or spirit of the invention. It is, therefore, to be understood that changes may be made in the particular embodiments of the invention described which are within the full intended scope of the invention as defined by the appended claims.

I claim:
1. A process for rendering flexible sheet material non-adherent to surfaces which normally adhere thereto which process consists essentially of:
   a. treating the sheet material with an aqueous emulsion containing:
      i. a neutralized polysiloxane emulsion produced by the process comprising:
         1. homogenizing a mixture which consists essentially of:
            A. a compound of the formula $(R_2SiO)_4$ wherein R is a monovalent hydrocarbon free of unsaturation;
            B. a compound of the formula:

$(RR^1SiO)_4$ wherein R is the same as hereinabove defined and $R^1$ is a hydrocarbon radical having vinyl unsaturation; and
            C. a benzene sulfonic acid compound of the formula:

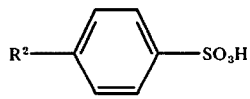

wherein $R^2$ is an alkyl group of from 6–18 carbon atoms and;
            D. water;
         2. heating the homogenized mixture of (1) to form said polysiloxane; and
         3. adding a neutralizing amount of an alkanolamine to said mixture to neutralize said benzene sulfonic acid and to form a neutralized emulsion of said polysiloxane, said polysiloxane having the formula:

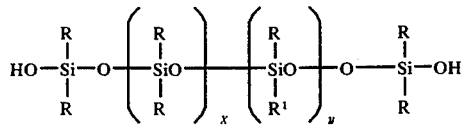

wherein R is a monovalent hydrocarbon radical free of unsaturation; $R^1$ is a hydrocarbon radical having vinyl unsaturation; x and y are positive integers so that the silanol stopped polysiloxane has from 0.1 to 1% by weight of $R^1$ groups and the viscosity of the polymer ranges between 25,000 centipoises and 1,000,000 centipoises;
      ii. an organic hydrogen polysiloxane having the formula:

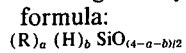

wherein R is a monovalent hydrocarbon radical free of unsaturation; $a$ is from 0 to 3; b is from 0.005 to 2.0 and the sum of $a$ plus $b$ is from about 0.9 to 3, there being at least two silicon-bonded hydrogen atoms per molecule; and
      iii. a platinum catalyst effective to cause copolymerization of (i) (ii); and
   b. thereafter drying the treated material.

2. The process of claim 1 wherein said polysiloxane has the formula:

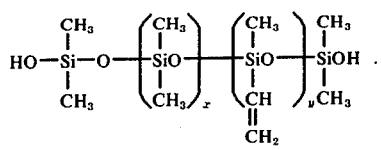

3. The process of claim 1 wherein the platinum catalyst is included in the homogenized mixture of step (1).
4. The process of claim 1 wherein the heating step (2) comprises heating the homogenzied mixture at a temperature of from 40°–100°.
5. The process of claim 1 wherein heating step (2) is followed by a cooling step.
6. The process of claim 5 wherein the benzene sulfonic acid is dodecylbenzenesulfonic acid.
7. The process of claim 6 wherein the alkanolamine is selected from compounds of the formula;

wherein $R^3$ is lower alkylene of from 1 to 8 carbon atoms.
8. A process as defined in claim 3 wherein the platinum catalyst is present in an amount to provide one platinum atom per 100 to 1,000,000 silicon-bonded vinyl groups in the poly-organosiloxane component.
9. A process as defined in claim 1 wherein the aqueous emulsion comprises:
   i. from 1 to 50% of the polysiloxane;
   ii. from 0.01 to 5% of the organic hydrogen polysiloxane;
   iii. from 0.00001 to 0.0005% of platinum in the form of a salt or complex; and
   iv. from 60 to 98% of water.

* * * * *